I. J. HATTABOUGH.

Horse Hay-Fork.

No. 71,167. Patented Nov. 19, 1867.

Witnesses.
R. H. Dibble
J. H. Billings

Inventor.
I. J. Hattabough

United States Patent Office.

ISAAC J. HATTABOUGH, OF SANTA CLARA COUNTY, CALIFORNIA.

Letters Patent No. 71,167, dated November 19, 1867.

IMPROVEMENT IN HORSE HAY-FORKS.

*The Schedule referred to in these Letters Patent and making part of the same.*

TO ALL TO WHOM THESE PRESENTS SHALL COME:

Be it known that I, I. J. HATTABOUGH, of Santa Clara county, and State of California, have made and invented a new and useful improvement in machinery for the moving and handling of grain, which I term the "Eagle Fork;" and of which the following, taken in connection with the annexed drawings, is a full, clear, and exact description.

Figure 3:
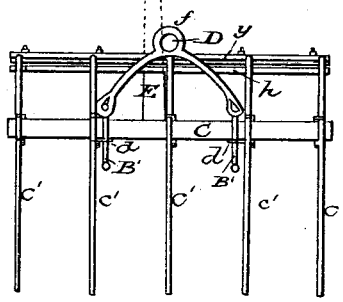

Figure 3 indicates a transverse section taken through the rings $B'$ $B'$ which form a part of the hinges of the fork, and shows an elevation of one of the rake-heads C to which the eagle-claw teeth $c'$ $c'$ $c'$ $c'$ are fastened, together with the bail or handle D which sustains the fork when in use. The two rake-heads C C are connected by hinges, which are formed by the slotted iron (or other metal) projections $d$ $d$ $d$ $d$ and the rings $B'$ $B'$, and by this arrangement, and being aided by the suspending-bail or handle D, whose extremities are linked through the said rings, these heads C C are left free to assume any position, open or closed, as may be required. There are two tong-handles or arms E E fastened on the top, or near the casters of the rake-heads C C, crossing each other under the bail or handle D, and provided on their under side with hooks $e$ $e$. These tong-handles are for the purpose of keeping the fork open as it may be lowered upon the grain or other loose substances which are to be lifted by it. The eagle-claw teeth $c'$ $c'$ $c'$ $c'$ $c'$ are formed after the shape indicated in the drawing, for the purpose of effecting the easiest possible entrance into loose and fibrous substances, securing the largest quantity of the same by their grasp; and, also, the easiest and quickest disengagement thereof when the fork is opened to discharge the same. These teeth are clamped by the wooden cross-pieces $g$ $g$ and the iron ones $h$ $h$, so as to constitute a stiff and rigid claw in their action upon the grain or other substances required to be operated on.

Figure 1:
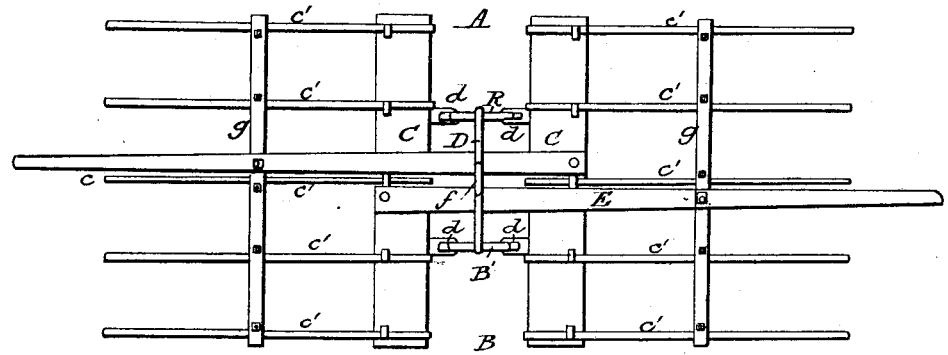
Figure 1 represents a plan or top view of the fork when open.
Figure 2:
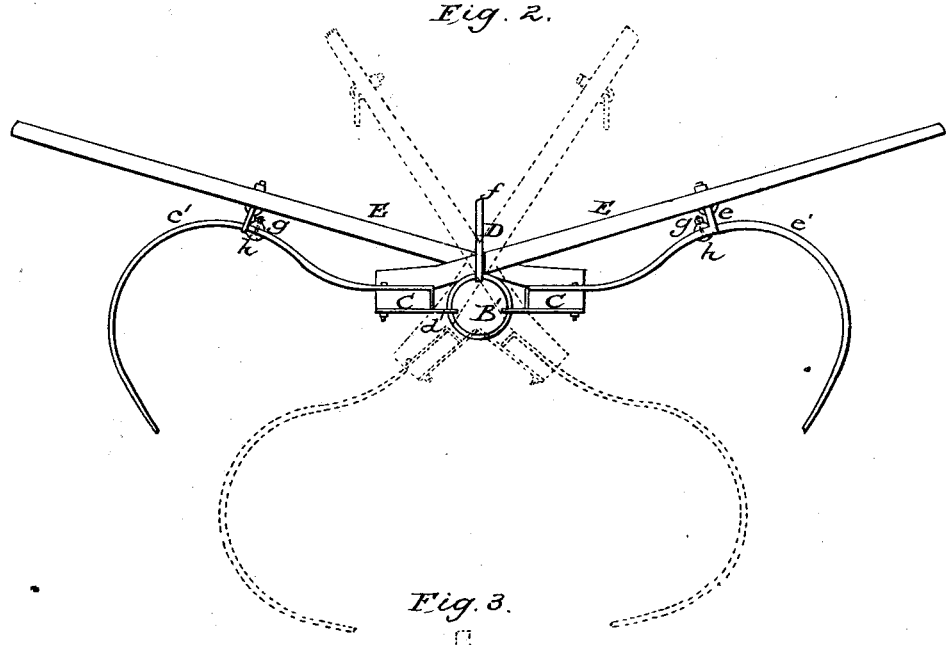
Figure 2 shows an end view or elevation, representing the positions of the fork when open, by the black lines, and, when closed, by the red.

The operation of the eagle fork when in use is as follows: The ring $f$ of the bail-handle D is attached to a hoisting-rope, and one of the hooks $e$ $e$ of the tong-handles E E is caught or placed by the operator of the fork upon the tooth $c'$ nearest to it, thus keeping the fork open until, in its descent, it lands upon the grain or other substance that is to be moved by it. Upon its alighting on this substance, the hook $e$ is disengaged from the tooth $c'$ by the operator, and the fork is prepared to take up its load. The action of hoisting the fork, the ends of the teeth being engaged in the loose materials to be moved, produces with them a forward motion by which they penetrate into the mass, and the continued hoisting closes the fork with a load in its grasp. The peculiar arrangement of the ring-hinge $B'$ $d$ freely permits this grasping and closing motion of the teeth, which being accomplished by the hoisting of the fork, the whole apparatus assumes the position shown by the red lines in fig. 2. In this position the fork with its load is conveyed to the place of deposit, where the latter is to be dropped. The load is disengaged from the grasp of the teeth by an operator pulling upon either tong-handle E E, so as to open the fork. In the same motion the hook $e$ attached to the handle is brought near a tooth, $c'$, of the opposite part of the fork, when it is placed thereon, and the whole is ready for a repetition of the operation described.

What I claim as my invention, and desire to secure by Letters Patent, is—

The slotted ring hinge $B'$ $d$, or its equivalent, and the claw-shaped teeth $c'$ $c'$ $c'$ $c'$ $c'$ $c'$ $c'$, in combination with the rake-heads C C and levers E E, all arranged and operating substantially as above set forth.

I. J. HATTABOUGH.

Witnesses:
JOSEPH H. ATKINSON,
HENRY HAIGHT.